(12) United States Patent
Brasse et al.

(10) Patent No.: US 8,488,138 B2
(45) Date of Patent: Jul. 16, 2013

(54) METHOD FOR COMPOSING A REFLECTIVITY HISTOGRAM AND REPROGRAPHIC APPARATUS USING THIS METHOD

(75) Inventors: Marco H. H. Brasse, Venray (NL); Sebastian P. R. C. De Smet, Venlo (NL); Marcus W. Krom, Eindhoven (NL)

(73) Assignee: OCE Technologies B.V., Venlo (NL)

( * ) Notice: Subject to any disclaimer, the term of this patent is extended or adjusted under 35 U.S.C. 154(b) by 0 days.

(21) Appl. No.: 13/355,395

(22) Filed: Jan. 20, 2012

(65) Prior Publication Data

US 2012/0140260 A1    Jun. 7, 2012

Related U.S. Application Data

(63) Continuation of application No. PCT/EP2010/059717, filed on Jul. 7, 2010.

(30) Foreign Application Priority Data

Jul. 24, 2009    (EP) .................................. 09166336

(51) Int. Cl.
  *G06F 3/12*    (2006.01)
(52) U.S. Cl.
  USPC ............ 358/1.13; 358/1.9; 358/2.1; 358/522; 382/168; 382/170; 382/171; 382/172; 382/271

(58) Field of Classification Search
  USPC ................... 358/1.13, 1.9, 2.1, 522; 382/168, 382/170, 171, 172, 271
  See application file for complete search history.

(56) References Cited

U.S. PATENT DOCUMENTS

| | | | | |
|---|---|---|---|---|
| 5,581,370 A | * | 12/1996 | Fuss et al. | 358/447 |
| 5,696,595 A | | 12/1997 | Yamanishi | |
| 5,748,802 A | * | 5/1998 | Winkelman | 382/271 |
| 2005/0129310 A1 | * | 6/2005 | Herley | 382/168 |
| 2006/0098243 A1 | | 5/2006 | Ahmed et al. | |
| 2009/0161952 A1 | * | 6/2009 | Matsui | 382/171 |
| 2010/0027887 A1 | * | 2/2010 | Kawashima | 382/171 |

FOREIGN PATENT DOCUMENTS

DE    43 09 878 C2    11/1993

\* cited by examiner

*Primary Examiner* — Jacky X Zheng
(74) *Attorney, Agent, or Firm* — Birch, Stewart, Kolasch & Birch, LLP

(57) ABSTRACT

A method for composing a global histogram of the values of the pixels of a hardcopy original includes a division of a detection area, which may be larger than the original, in stripes. For each of the stripes, a local histogram is made, which is added to a candidate histogram. If the decision is made from the values of the local histogram that a stripe belongs to the original, the candidate histogram is added to the global histogram. In this way, a representative histogram of the original is obtained, even if the white pixels from the original are indiscernible from the white pixels from the cover of the scanner. The method is embodied in an electronic component, including an application specific processing unit.

5 Claims, 4 Drawing Sheets

METHOD FOR COMPOSING A REFLECTIVITY HISTOGRAM AND REPROGRAPHIC APPARATUS USING THIS METHOD

CROSS-REFERENCE TO RELATED APPLICATIONS

This application is a Continuation of International Application No. PCT/EP2010/059717, filed on Jul. 7, 2010, and for which priority is claimed under 35 U.S.C. §120, and which claims priority under 35 U.S.C. §119 to Application No. 09166336.9, filed on Jul. 24, 2009. The entirety of each of the above-identified applications is expressly incorporated herein by reference.

BACKGROUND OF THE INVENTION

1. Field of the Invention

The present invention relates to a method for composing a global histogram of values of pixels during transformation of a hardcopy original to an electronic representation by means of an opto-electronic conversion device. The method of the present invention includes the steps of establishing a division of a detection area in stripes, each stripe comprising several scanlines; for each stripe composing a local histogram of values of pixels within the stripe; determining from the local histogram if the stripe originates from the hardcopy original; and composing the global histogram from the various local histograms.

The present invention further relates to a reprographic apparatus and an electronic component.

2. Background of the Invention

Hardcopy originals are commonly digitized by scanner systems in which light from a light source is reflected by the original and converted to an electric signal by an opto-electronic conversion device, further also referred to as an image sensor. This is, e.g. a CCD-array or a CMOS chip, which are examples of linear image sensors. The digitization of this electric signal takes place in an analog-to-digital convertor (ADC) with a certain number of bits for each pixel, which determines an available dynamic range for the digitized signals. Many scanners use a fixed, transparent plate on which the original is placed and move the light source and optical system, comprising mirrors and diaphragms, in such a way that lines of the original are successively projected on the image sensor. At regular time intervals, the signals of the image sensor are digitized by the ADC. This divides the image of the original into scanlines parallel to the image sensor. The discrete elements of the image sensor divide each scanline into pixels.

In principle, the reflectivity of the original at the position of a pixel, also called the optical density, determines the digital output value of the pixel. Important factors influencing the transfer function of the optical density to the digital output value are the strength of the light source, the sensitivity of the image sensor, the exposure time for each scanline, and the geometry of the hardware. Both well reflecting originals, such as office documents on white paper, and less reflecting documents, such as newspapers, are supposed to give a digital value that will be used to generate a "no ink" value, whereas positions on the original that reflect little light will be used to generate a digital value corresponding to "ink". The "no ink" value is referred to as "white," and the "ink" value is referred to as "black". If the image sensor has color filters for different channels the disclosed matter refers to the signal of each color channel separately or to a combination of signals in the color channels. The ratio of the extreme values for the reflectivity is called the dynamic range of the original. This dynamic range is much smaller for newspaper originals than for office documents printed on white paper.

The dynamic range of an original is established by a histogram of occurring values for the pixels in the original. A histogram contains the occurrence frequency for digital values. The adjustment of the dynamic range of an original to the available, fixed dynamic range of the values of the pixels after the ADC (in the case of an N bits ADC this dynamic range is $2^N$), is commonly done in the digital domain, where algorithms exist that stretch a histogram of obtained digital values of a specific original. An example of such an algorithm is the derivation of a whitepoint and a blackpoint for an original, followed by a linear expansion of the digital values using these derived values.

In principle, only pixels originating from the original are to be used for the histogram. The original often has a size smaller than the size of the detection area, which is the complete area from which pixels are acquired. Therefore some pixels that are retrieved in the detection area stem from the original and other pixels stem from an area outside the original. During retrieval of the scanlines, most of the time, a cover that belongs to the scanner system is placed over the detection area with the original between the transparent plate and the cover. If the cover is closed over the original, the pixels that do not come from the original will come from the inside of the cover, which is usually white. Therefore these pixels will have the value "white." If the cover is open, the pixels that do not come from the original come from non-reflecting parts. These pixels will have the value "black". In both cases, if these pixels are included in the histogram, the histogram is not a true representation of the reflectivity of pixels of the original. Therefore the dynamic range is estimated incorrectly. This incorrect estimation especially affects the reproduction of originals of the newspaper type.

There is a problem however, in that the white of the cover is often indiscernible from the white paper of office documents. If the white pixels originating from the white paper are not included in the histogram, the number of white pixels in the histogram is not correct and the histogram is not representative of the document. If the white pixels of the cover are included, the histogram is not representative either. If the histogram is not representative, incorrect white- and blackpoints are derived, resulting in either background toner or ink at the time of printing a copy of the original or in rendering light gray or colored parts of the original as white, causing these parts to disappear against the material that is printed upon. Even if the white of the cover is different from the white of the original, there is a problem with regard to how to discern pixels from the cover and the original, because the level of the white of the cover is variable due to possible light pollution.

If all values of the pixels that need to be scanned could be used for determining a histogram of the values of the pixels in the original, it would be possible to discriminate the pixels belonging to the original by selecting parts of the detection area and determining for each part if it belongs to the original or not by considering the position of the selected part and the occurring values of the pixels in the selected part. However, for a fast document scanner this technique takes too much time. An important constraint for a method for composing a global histogram, which refers to the histogram that is representative for the complete original, is that it is required to decide during acquisition whether or not to include the obtained values, i.e. at a time not all values of the pixels are available. Note that during acquisition, the size of the original is also not available. Another constraint is in the amount of memory that is needed in making this histogram.

A method according to the preamble is known, e.g. from U.S. Pat. No. 5,696,595. In this patent, a method for composing a global histogram for the original is described in which predetermined areas are defined for which an independent decision is taken whether or not they belong to the original. The decision to include values is made based on the distribution of values in a local histogram, which is made for a part of the original. The criterion is that a sufficient number of values are either not completely black, or completely white. If a defined area belongs to the original, a part of the global histogram for the original is replaced by the local histogram of that area. A disadvantage of this method is that the values of pixels in an original having a white background may not be included in the histogram, when these pixels are in an area that is indiscernible from the cover. Therefore the number of white values and the dynamic range of the original are not well reflected in the final histogram. Pixels of the white cover are rightfully not included. However, white pixels in the original are incorrectly not included as well. A problem in the background art is that the decision to include pixels is based on their value only.

SUMMARY OF THE INVENTION

The purpose of the present invention is to provide a method that generates a global histogram of the values of all pixels originating from an original that is aligned to a side of the detection area where a first scanline is acquired, including the white pixels from the original, but not including the white pixels of the cover.

To overcome the disadvantages and problems of the background art, the method for composing a global histogram is improved in that the step of composing the global histogram comprises the steps of adding the local histogram to a candidate histogram and if the stripe originates from the hardcopy original, both adding the candidate histogram to the global histogram and clearing the candidate histogram, where the hardcopy original is aligned to a side of the detection area where a first scanline is acquired.

A local histogram that is made for a stripe comprising a number of scanlines equivalent with a distance of, e.g. 2 mm to 5 cm on the original, is added to the candidate histogram independent of the decision that this stripe is part of the original. When, from the local histogram, it is decided that the stripe is part of the original, the candidate histogram is added to the global histogram. Then, the candidate histogram is cleared, which means that for every occurring value, the occurrence frequency is set to zero. If in a stripe, a large black or white area is scanned and the local histogram indicates that the stripe is not part of the original, the candidate histogram will not be added to the global histogram, but the candidate histogram is saved and the local histogram of a next stripe is composed. If the next stripe is classified as part of the original the candidate histogram will be added to the global histogram and the pixels of the large black or white area will be included in the global histogram. Therefore, the pixels from the large black or white area will not be left out of the global histogram as in the current state of the art. After the scanning optics have passed the end of the hardcopy original, no further stripe will be classified as belonging to the original and no more candidate histograms will be added to the global histogram. Therefore, large black or white areas which do not correspond to areas on the original will not be included in the global histogram.

In a further embodiment, the method according to the present invention comprises the further steps of dividing each stripe into blocks in a perpendicular direction to the division into stripes, making a local histogram for each block, and determining from each of the local histograms if the corresponding block belongs to the hardcopy original. This is advantageous, if the original has a skewed edge. Through these steps, the risk of including too many white pixels of the cover in the histogram is nullified.

In a further embodiment, the method according to the present invention comprises the further steps of saving the local histogram of the last stripe that is determined to be part of the original, and subtracting this histogram from the global histogram after completing the global histogram. This certifies that the global histogram does not include pixels of an edge of the original, which could include many pixels that are not representative for the reflectivity of the original. In general, it is better to leave out some pixels of the histogram, if there is doubt about their origin, even though they may belong to the original, than to include pixels that may belong to the white cover.

In a particular embodiment of the present invention, an electronic component is configured as an application specific programming unit to apply one of the methods of the present invention. As the method is suitable for application during scanning, it has been found to be advantageous to incorporate the method in an application specific programming unit, but other forms of implementation are not excluded.

The present invention also relates to the use of any of these methods in a reprographic apparatus comprising a scanner for converting a hardcopy original into an electronic representation. The generation of a global histogram that comprises all pixels of the original makes it possible to match the varying dynamic ranges of originals to the dynamic range of the reprographic apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
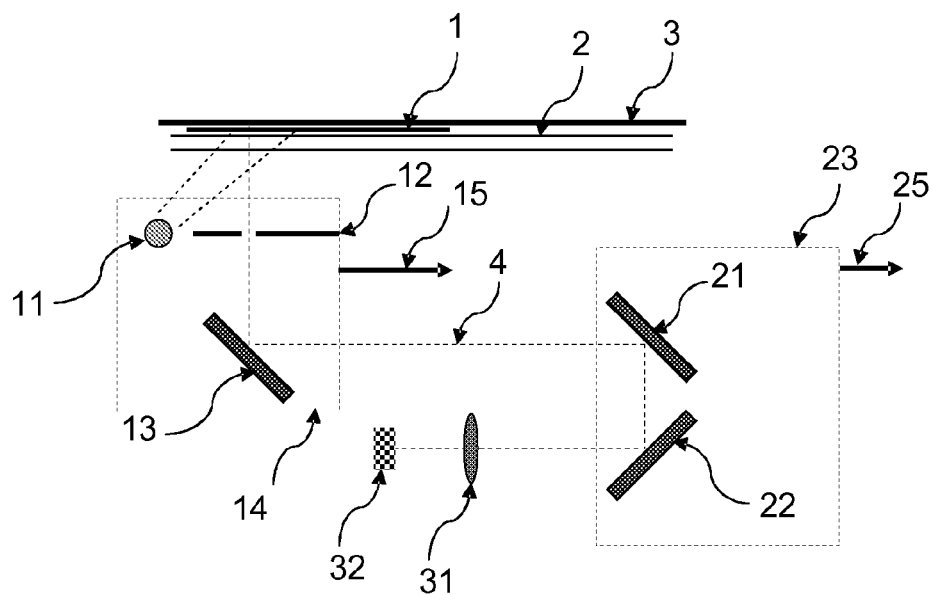
FIG. 1 illustrates the general outline of the optical elements of a document scanner.

Although in the figures a preferred embodiment is described, other embodiments are very well possible. In FIG. 1, the optical elements of a document scanner are shown in a cross-section. These elements comprise a lightsource (11), a diaphragm (12), three mirrors (13, 21, 22), a lens (31) and a linear image sensor (32). The lightsource (11), diaphragm (12) and mirror (13) are mechanically fixed to each other, indicated by a block (14), and can be moved in a direction parallel to the glass plate (2). The mirrors (21) and (22) are also fixed to each other (23), indicated by a block 23, and move with a velocity, indicated by the arrow (25), that is half the velocity of the block (14), indicated by the arrow (15). In this way the length of the optical path (4) from the original (1) to the image sensor (32) is kept constant. On top of the original (1) is a cover (3). From the figure, it shows that not only pixels from the original (1) are monitored, but also from the inside of the cover (3). The inside of the cover (3) is white, as is customary in this type of scanners. If the original material is white, the pixels outside the original (1) are indiscernible from the pixels originating from the unmarked original material. The process of scanning an original is controlled by a central processing unit (CPU), which is not shown in the figure. The program on this processor that makes the various functions work together is referred to as embedded control.

Figure 2:
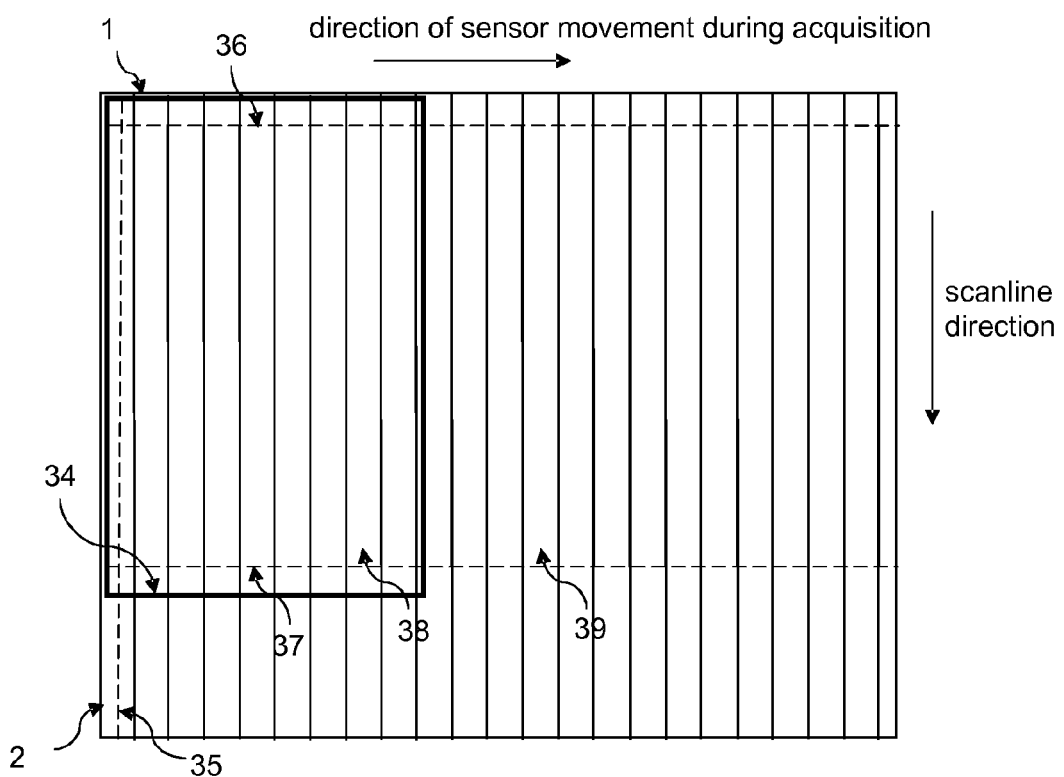
FIG. 2 illustrates the placement of the hardcopy original on the transparent plate and the division of a detection area in stripes.

FIG. 2 shows a transparent plate (2), on which a hardcopy original (1) is placed. The detection area is divided in stripes of which some comprise part of the original (38) and other comprise part of the cover only (39). A lower edge of the document (34) is detected, which is used to limit the area from which valid pixels are obtained. Around the established boundaries of the hardcopy original some margin is defined (35, 36, 37). Note that in the direction of the sensor movement during acquisition, the boundary of the hardcopy original is unknown.

Figure 3:
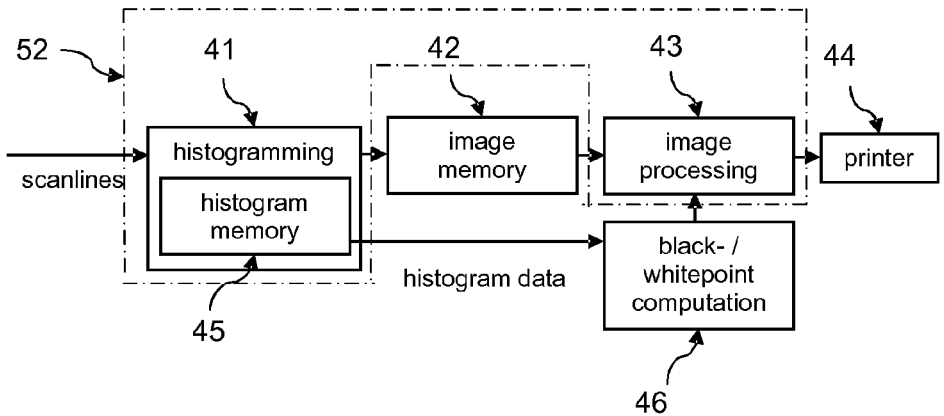
FIG. 3 provides an overview of the functional blocks of the image processing of the scanner data.

FIG. 3 shows the modules needed for the processing of scanlines up to the reproduction of the original by a printing process. It is noted, however, that the digital data may also be stored in a non-volatile memory device for later use. During acquisition, the scanlines pass the histogramming module (41) for analysis and are then saved in the image memory (42). After completion of the scanning process the global histogram has been formed in the histogram memory (45), where it is available for the computation of a black- and whitepoint (46). These are used in the image processing module (43) to enlarge the dynamic range of the values of the pixels. After this, other processing steps are anticipated, such as halftoning, to make the data suitable for a digital printing process (44), comprising electrophotography or ink jet. The block around the histogramming module (41) and image processing module (43) indicates that these modules are part of one physical embodiment.

Figure 4:
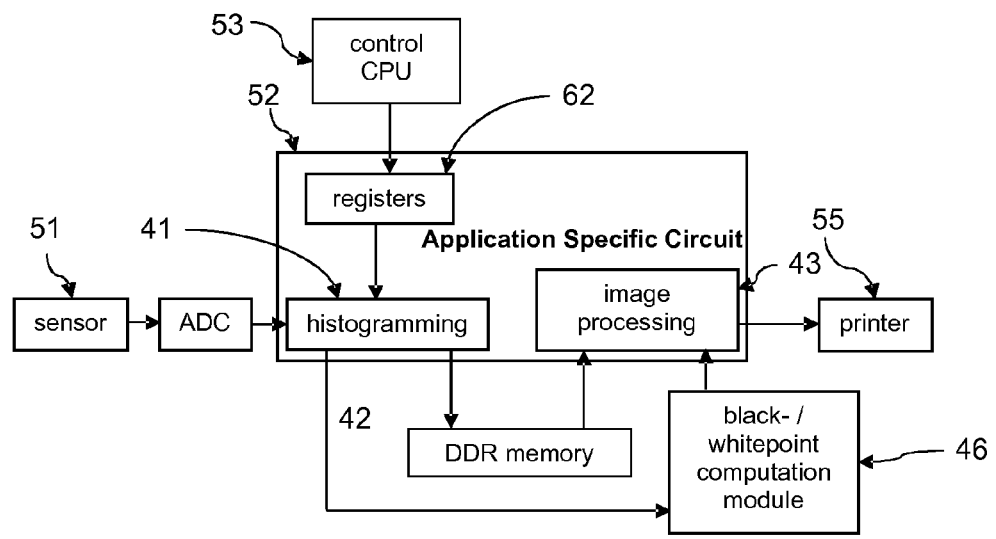
FIG. 4 illustrates an outline of an implementation of the histogramming function.

FIG. 4 shows the integration of the histogramming module with other image processing modules in an application specific circuit (52), configured to process the signals from the image sensor (51) for reproduction in a printer (55). The CPU (53) is used to set the registers (62) that are used by the histogramming module (41). Fast memory (54) is provided for the image to be stored temporarily.

Figure 5:
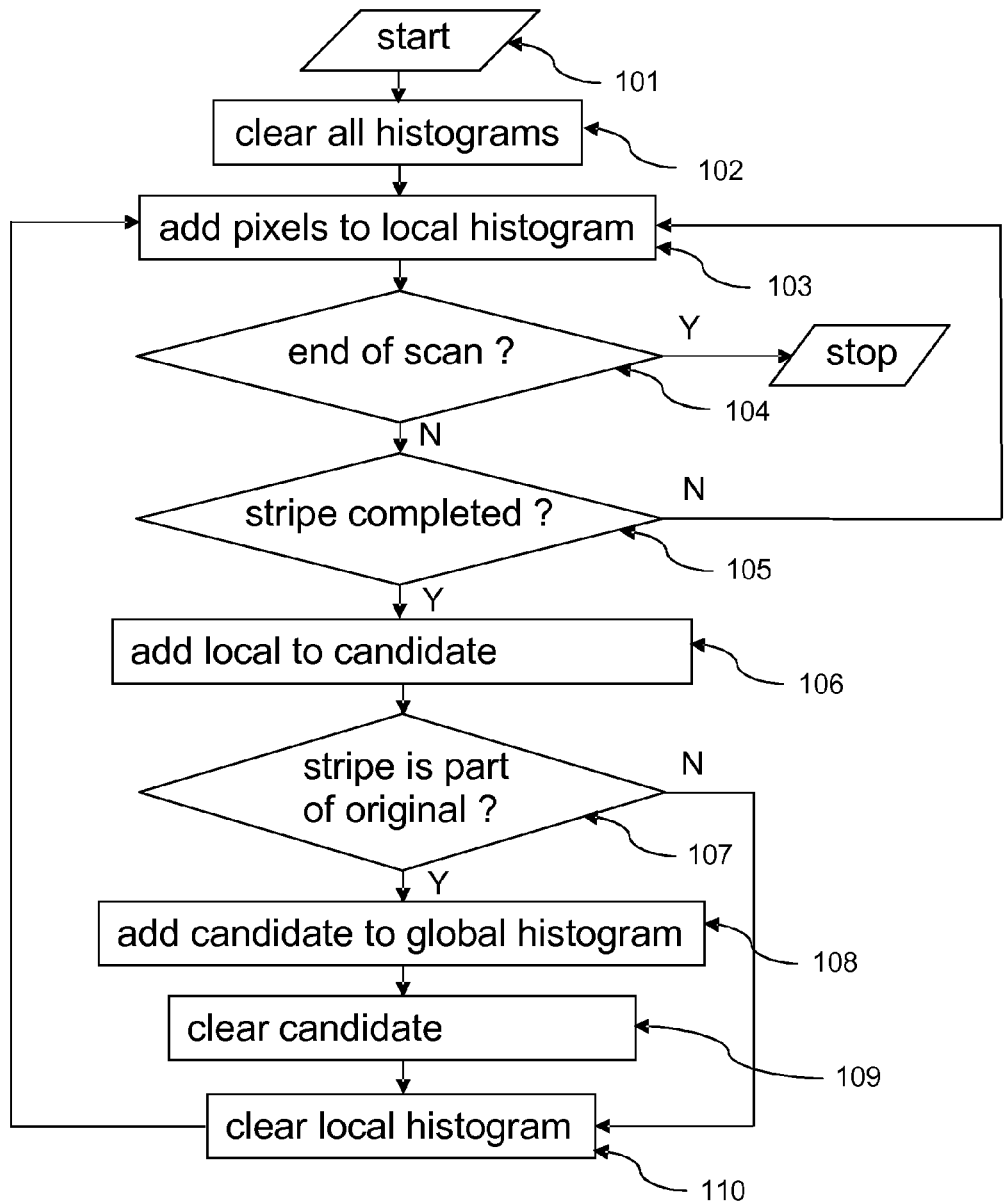
FIG. 5 is a flow chart of the histogramming function.

The flow diagram in FIG. 5 shows the steps of the invented method. The process starts (101) when embedded control starts the acquisition of scanlines. First, all histograms, global, candidate and local, are cleared, which means that for every occurring value the occurrence frequency is set to zero (102). Then, pixels are added to a local histogram (103). It is noted that it is not necessary to include all pixels in a local histogram, but a selected number of pixels in the stripe suffice. This is called sub-sampling. Also, the values of the pixels for histogramming may be rounded to a smaller number of bits than the number of bits that are used to represent the value itself. The process checks if the scan movement has ended (104). If so (Y), the process stops. If not (N), a check is made to see if the stripe is completed (105). If not (N), the process returns to acquiring pixels for the local histogram (102). If the stripe is completed (Y), the local histogram is added to the candidate histogram (106). Then, a test is performed to see if the stripe is corresponding to a part of the original (107). There are several ways to do this, one of them being to determine a ratio of the number of pixels having a value intermediate between two predefined values and the total number of pixels. If a substantial number of pixels in a stripe has an intermediate value, and thus the ratio is larger than a threshold value (Y), the stripe is considered to be part of the original. In that case the candidate histogram is added to the global histogram (108), and the candidate histogram is cleared (109). If the ratio is smaller than a threshold value (N), the stripe is not considered to be part of the original, and these steps are passed. At this point the local histogram is cleared (110) and the process jumps back to adding pixels to the local histogram (103).

Figure 6:
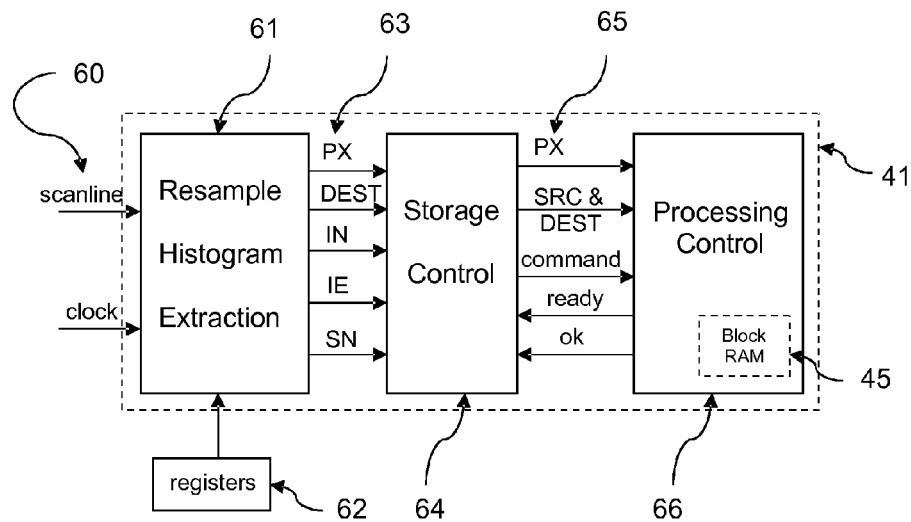
FIG. 6 is subdivision of the histogramming function into a number of functional blocks.

FIG. 6 shows a subdivision of the histogramming functional module (41) in a preferred embodiment. Starting with digital data from the ADC, indicated by "scanline" (60), first, a module for resampling is passed (61). In this module, counters are used to determine if a pixel is to be included in the local histogram by comparing the counters to predefined values from the registers (62). If it is to be included, the pixel is called a valid pixel and the scanline to which this pixel belongs is called a valid scanline. The registers comprise a value for the position where valid scanlines for the histogram start (35), a value where valid scanlines for the histogram end, values indicating the position of the upper and lower side of the original (36, 37), a value for the number of scanlines within a stripe, and a value for the number of valid pixels within a valid scanline. Only a representative number of pixels is included in the histogram. This results in five digital signals: PX contains the six most significant bits of the pixel value and DEST contains three bits for indicating the destination histogram from the possible histograms that are indicated in Table 1. The signal IN indicates if a new image is started, IE indicates that the image is ended and SN indicates that a pixel is located in a new stripe (63). In this embodiment, two local histograms are used: one for the upper half of the stripe and one for the lower half of the stripe. This is advantageous if the original has a skewed edge.

TABLE 1

Histogram table allocation

| Table name | NUMBER |
|---|---|
| HISTO_LOCAL1 | 0 |
| HISTO_LOCAL2 | 1 |
| HISTO_CANDIDATE | 2 |
| HISTO_LAST_ORIGINAL | 3 |
| HISTO_CUMULATIVE | 4 |

These signals are input to the Storage Control module (64) where a series of commands are read from memory to execute the histogramming method according to the invention as given in FIG. 5. Commands comprise an OPCODE of three bits which are indicated in Table 2 for one of seven possible operations the Processing Control module (66) is to execute. Storage Control also indicates a source table, SRC, of three bits and a destination table, DEST, which are selected from the histogram tables in Table 1. The bits for these histograms are affixed to the bits that indicate the value of the pixels, PX, which forms the entry in a histogram. In that way a unique address is generated, which is used in the Block RAM (45) to locate the number of times a pixel having the value PX is found in the image for a specified histogram.

Figure 7:
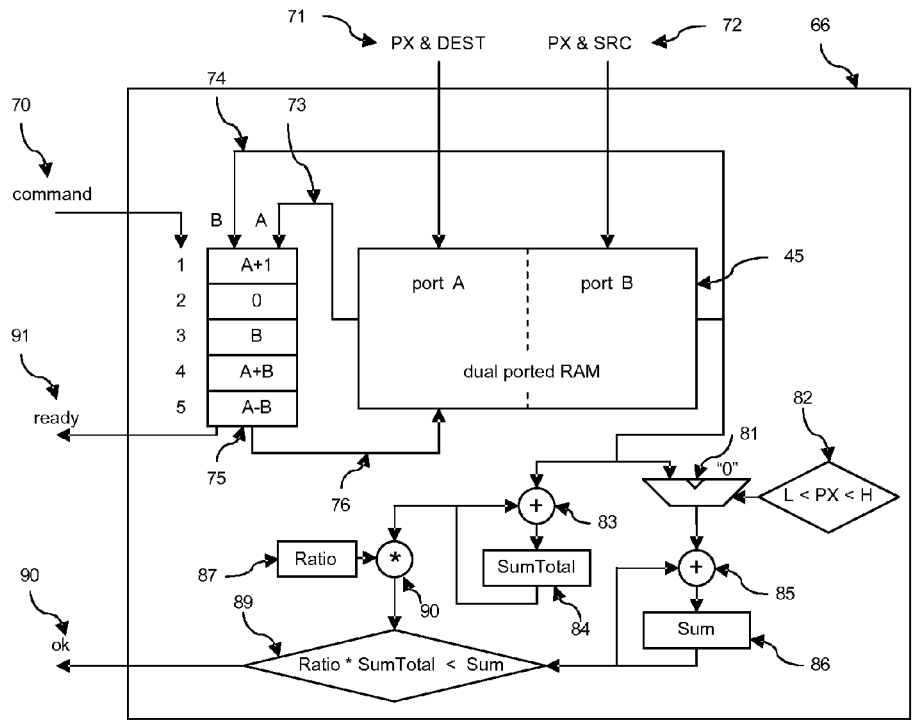
FIG. 7 is the implementation of the processing control block using a dual ported RAM block.

A possible embodiment of the Processing Control module is depicted in FIG. 7. It is centered around a dual ported RAM (45). When the Processing Control is finished executing the command, a "ready" signal is given back to the Storage Control module, which will issue a next command.

The possible commands are listed in Table 2. When the command NOP is issued, the histograms in the dual ported RAM can be accessed by embedded control.

TABLE 2

Histogram processing commands

| OPCODE | VALUE | SYNOPSIS |
|---|---|---|
| NOP | 0 | wait |
| INCREMENT | 1 | add one to table (DEST) at address of pixel value |
| CLEAR | 2 | make all entries of a table zero |
| COPY | 3 | copy all entries of one table to another |
| ADD | 4 | add all entries of one table to another |
| SUBTRACT | 5 | subtract all entries of one table from another |
| CANDIDATE | 6 | check if histogram classifies as part of original |

During processing of valid pixels, an INCREMENT command is issued. The signal PX is affixed to the destination histogram, DEST, to generate the address of port A (71) where one count is to be added. This takes one read cycle during which the content of the address is placed on the output bus of port A (73) and one write cycle during which the result of the calculation (75) is placed on the input bus of port A (76). The output bus of port B (74) is used for the commands COPY, ADD, and SUBTRACT. For these commands the signal PX is not related to a pixel value, but is a counter that runs through the complete range of possible values for the valid pixels. On the address bus of port B (72), the combination of the signal PX and SRC is set, SRC indicating the histogram from which a histogram value is read. The final command is the CANDIDATE command that is issued when the signal SN indicates that a new stripe starts. At that time, the histogramming function is set to check whether the completed stripe is part of the original or not (step 107, FIG. 5). This is done by placing successively all counted values for the histogram SRC, which then indicates one of the values HISTO_LOCAL1 and HISTO_LOCAL2, on the output bus of port B. These values are added (83) to the value "SumTotal" (84). In another branch of the bus, the values are led to a multiplexer (81) that passes the signal only when the counted values belong to a pixel value that is between two limits (82). Otherwise it will pass the value zero. The counted values that fulfil the requirement are added (85) too to give a total value "Sum" (86), which is necessarily smaller than "SumTotal". In fact, it represents the amount of pixels that can neither be designated "black" or "white". Therefore it is the amount of pixels that have a value in between these extremes. If this number of pixels is larger than a predefined proportion of the total amount of pixels, as obtained by multiplying (88) "SumTotal" (84) by the predefined "Ratio" (87), which values are compared in (89), the stripe is determined to be part of the original and the "ok" signal (90) indicates this to the Storage Control module, corresponding to the outcome "Y" in step 107 in FIG. 5. After finishing the command the "ready" signal (91) will indicate this to the Storage Control module.

Depending on the outcome, the Storage Control module will execute the next command, following the flow diagram as given in FIG. 5. When the image ends, indicated by the signal IE (63, FIG. 6), the Storage Control module will issue the command NOP. In that state, the Block RAM is accessible for embedded control that will pass the values of the global histogram to the black-/whitepoint computation module (46, FIG. 3) that will pass the two values for the blackpoint and the whitepoint of the image to the image processing module. This module processes all the pixels of the image for optimal reproduction on the printer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for composing a global histogram of values of pixels during transformation of an image on a hardcopy original to an electronic representation of the image by means of an opto-electronic conversion device generating scanlines, said method comprising the steps of:
    establishing a division of a detection area in stripes, each stripe comprising several scanlines;
    initializing a candidate histogram and said global histogram;
    for each stripe:
        scanning the stripe;
        composing a local histogram of values of pixels within the stripe;
        adding the local histogram of values of pixels to the candidate histogram;
        determining from the local histogram, if the values of pixels in the stripe originate from the hardcopy original; and
        if it is determined that the values of pixels in the stripe originate from the hardcopy original, both adding the candidate histogram to the global histogram and clearing the candidate histogram; if it is determined that the values of pixels in the stripe do not originate from the hardcopy original, neither adding the candidate histogram to the global histogram nor clearing the candidate histogram, such that, after scanning a subsequent stripe, said candidate histogram still comprises said local histogram and said local histogram becomes part of the global histogram only if it is determined that the values of pixels of said subsequent stripe originate from the hardcopy original; and
    finalizing the global histogram after scanning the last stripe,
    wherein the hardcopy original is aligned to a side of the detection area where a first scanline is acquired.

2. The method according to claim 1, further comprising the steps of:
    dividing each stripe into blocks in a perpendicular direction to the division into stripes;
    making a local histogram for each block; and
    determining from each of the local histograms, if the corresponding block belongs to the hardcopy original.

3. The method according to claim 1, further comprising the steps of:
    saving the local histogram of a last stripe that is determined to be part of the original; and subtracting the local histogram from the global histogram after completing the global histogram.

4. An electronic component configured as an application specific programming unit to apply the method according to claim 1.

5. A reprographic apparatus comprising:
- a scanner for converting a hardcopy original into an electronic representation;
- an application specific processing unit for performing image processing; and
- a CPU for controlling the behavior of the apparatus, and a printing process for marking paper,
- wherein of the method of claim 1 is applied in the application specific processing unit.

* * * * *